(No Model.)
W. LIESS & M. MAHER.
PROCESS OF AND APPARATUS FOR MOLDING STARCH INTO BLOCKS.
No. 284,447. Patented Sept. 4, 1883.
Fig. 1.
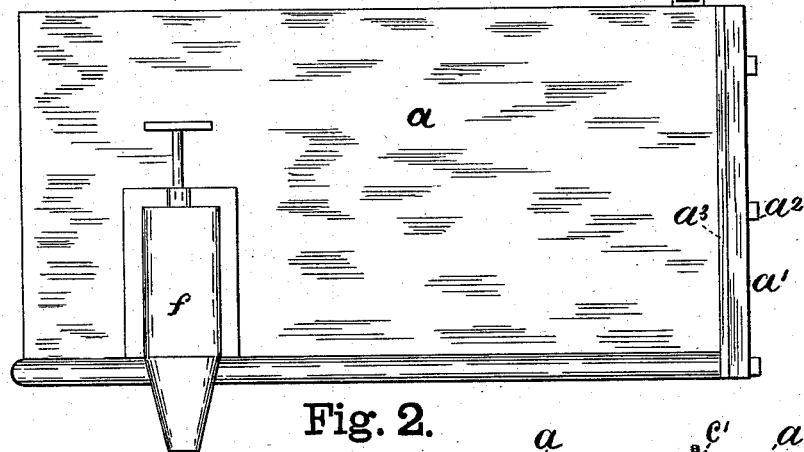
Fig. 2.
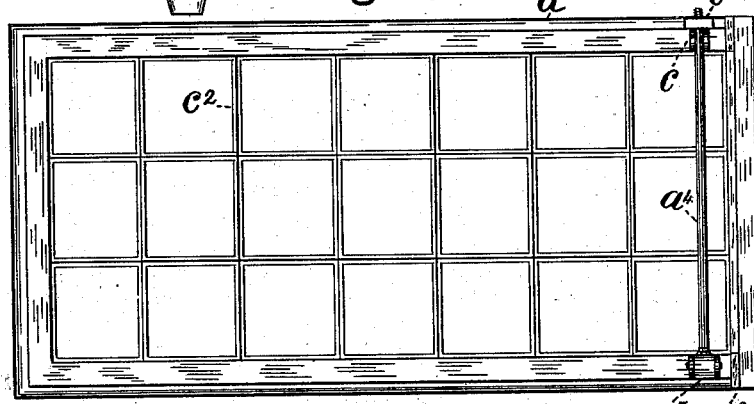
Fig. 3.
Fig. 4. 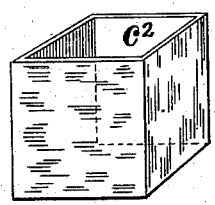 Fig. 5. 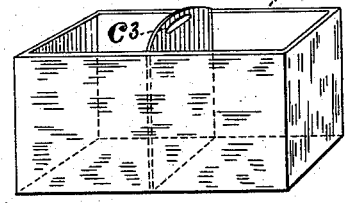 Fig. 6. 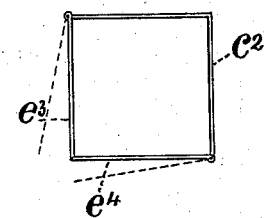
Fig. 7.
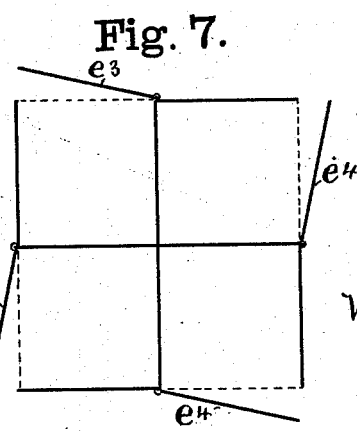
Witnesses.
J. W. Caldwell
A. J. Sangster
Inventors.
Wilhelm Liess
Martin Maher
By James Sangster
Atty.

UNITED STATES PATENT OFFICE.

WILHELM LIESS AND MARTIN MAHER, OF BUFFALO, NEW YORK, ASSIGNORS OF ONE-FOURTH TO JAMES S. HOLMES, OF SAME PLACE.

PROCESS OF AND APPARATUS FOR MOLDING STARCH INTO BLOCKS.

SPECIFICATION forming part of Letters Patent No. 284,447, dated September 4, 1883.

Application filed June 12, 1883. (No model.)

*To all whom it may concern:*

Be it known that we, WILHELM LIESS and MARTIN MAHER, both citizens of the United States, residing in Buffalo, in the county of Erie and State of New York, have invented certain new and useful Improvements in Processes of and Apparatus for Molding Starch into Blocks, of which the following is a specification.

This invention relates to a certain means and apparatus for molding and settling starch, and is an improvement on the invention for which one of the parties to this invention obtained a patent dated April 10, 1883, No. 275,394.

The object of this invention is to provide the means for molding starch in blocks, which will be fully and clearly hereinafter shown by reference to the accompanying drawings, in which—

Figure 1 is a side elevation. Fig. 2 is a plan or top view. Fig. 3 is a section through one of the small boxes, showing a suitable means for releasing the block of starch. Fig. 4 is a perspective view of one of the starch boxes or molds. Fig. 5 is a modification of the same. Figs. 6 and 7 are also modifications.

The large box or vat $a$ is provided with a removable end or door, $a'$. It is bolted in place by bolts $a^2$, a packing of rubber or other suitable material, $a^3$, being interposed to insure a tight joint.

$a^4$ represents a strengthening-bar for holding the upper front portions of the vat together. It is connected by a hinged joint, $a^5$, to the side of the vat or box, and its opposite end drops down between two ears, $c$, and is secured by a nut, $c'$; but any other equivalent arrangement adapted for the purpose may be used. The small boxes $c^2$ are adapted to set in the bottom of the large box or vat, substantially as shown in Fig. 2, and may be made of any form desired—for instance, a hexagon or any other suitable form—and, if required, a handle, $c^3$, may be put on; or the boxes can be made so that one or more sides may be set on hinges, so as to open, and in that way let the block out. (See Figs. 5, 6, and 7.) In the molding of starch the large vat should be deep enough to hold sufficient starch in suspension to fill the small boxes $c^2$ when it has settled down into them. After the small boxes are filled with the starch they are taken out, either by lifting them up by the handles $c^3$ or by taking off the end or door $a'$, and taking the small boxes off with the starch in them. They are then taken to a suitable press—for instance, similar to that shown in Fig. 3—in which the box, with the block of starch in it, is put on the table $c^4$, and the pivoted arms $c^5$ are brought up so that the hooks $e$ catch over the edges of the box, and thereby hold it down to the table, after which, by a foot-step or any other well-known means, the plunger or piston $e'$ is forced against the block of starch $e^2$ with sufficient power to push it out of the box. One advantage in thus pushing a block of starch out of the boxes (which are open at the top and bottom) is that the block is perfect or unbroken, whereas in taking it out in any other way it is liable to be broken. If the hinged parts $e^3$ $e^4$, (shown in Figs. 6 or 7,) are opened away from the block, portions of the starch are liable to stick to it and break away from it.

In Fig. 1, $f$ shows a valve similar to that described in the patent to Wilhelm Liess, above mentioned, and it requires no further description here. If desired, a cloth may be placed on the bottom of the vat to permit an easier separation of the boxes and blocks of starch therefrom. A bottom may be put on the boxes $c^2$, if desired.

We claim as our invention—

1. An apparatus for settling starch, consisting of a large settling box or vat, in combination with a series of smaller removable boxes open at the top and bottom to receive the settling starch and mold it to the form desired, substantially as described.

2. A starch box or vat having the removable end or side $a'$, packing $a^3$, and bolts $a^2$, in combination with a series of removable open boxes, $c^2$, substantially as specified.

3. The within-described process of molding starch into blocks, consisting in placing the starch-liquor into a box or vat provided with a series of removable open boxes and allowing the starch to settle into them, and then removing the boxes from the vat and taking the starch-blocks therefrom, substantially as described.

WILHELM LIESS.
MARTIN MAHER.

Witnesses:
J. M. CALDWELL,
JAMES SANGSTER.